United States Patent [19]

Takagi et al.

[11] Patent Number: 5,774,817
[45] Date of Patent: Jun. 30, 1998

[54] COMMUNICATION CIRCUIT FOR LOCAL AREA NETWORK

[75] Inventors: Nobutomo Takagi, Okazaki; Yasushi Kanda, Aichi-ken; Akihiro Sasaki, Anjo; Shigeru Uehara, Toyota; Shinji Shimoke, Nagoya, all of Japan

[73] Assignee: Nippondenso Co., Ltd., Kariya, Japan

[21] Appl. No.: 536,328

[22] Filed: Sep. 29, 1995

[30]  Foreign Application Priority Data

Sep. 30, 1994 [JP] Japan .................................. 6-237465
Mar. 8, 1995 [JP] Japan .................................. 7-048852

[51] Int. Cl.[6] .............................. B60Q 1/00; H04J 3/14
[52] U.S. Cl. .................................. 701/1; 701/29; 701/34; 370/216; 370/245; 370/252; 340/932.2; 307/10.1
[58] Field of Search ...................... 364/423.098, 424.034, 364/424.59; 340/825.06, 933, 438, 932.2, 458; 370/216, 241, 242, 245, 252, 230, 908; 307/10.1

[56]  References Cited

U.S. PATENT DOCUMENTS 5,384,765  1/1995  Sakagami et al. ....................... 340/458
5,404,498  4/1995  Tanaka et al. ......................... 395/185.1
5,408,227  4/1995  Hirabayashi et al. .................. 370/908
5,450,403  9/1995  Ichii et al. ............................... 370/216
5,483,517  1/1996  Kurata et al. .......................... 370/241
5,485,580  1/1996  Takai et al. .......................... 364/238.5
5,488,324  1/1996  Mizuta et al. ............................ 327/77
5,523,978  6/1996  Yoon et al. ............................. 365/229

FOREIGN PATENT DOCUMENTS 4-024140  1/1992  Japan .
4-063744  2/1992  Japan .
6-303242  10/1994  Japan .

*Primary Examiner*—Tan Q. Nguyen
*Attorney, Agent, or Firm*—Cushman Darby & Cushman IP Group of Pillsbury Madison & Sutro LLP

[57]  ABSTRACT

A circuit arrangement disposed in a node within a local area network is connected to a communication bus within the local area network. The circuit arrangement includes an input circuit for introducing data from the communication bus into the node. A node state detecting device is operative for detecting whether or not the node is in a stand-by state. A power feed suspending device is operative for suspending power feed to at least part of the input circuit when the node state detecting device detects that the node is in the stand-by state. A power feed restarting device is operative for monitoring a voltage at the communication bus, and restarting the power feed to at least part of the input circuit when the voltage at the communication bus becomes equal to a level indicating reception of data. A protective circuit is operative for protecting the input circuit from an abnormal current which flows from the communication bus.

15 Claims, 13 Drawing Sheets

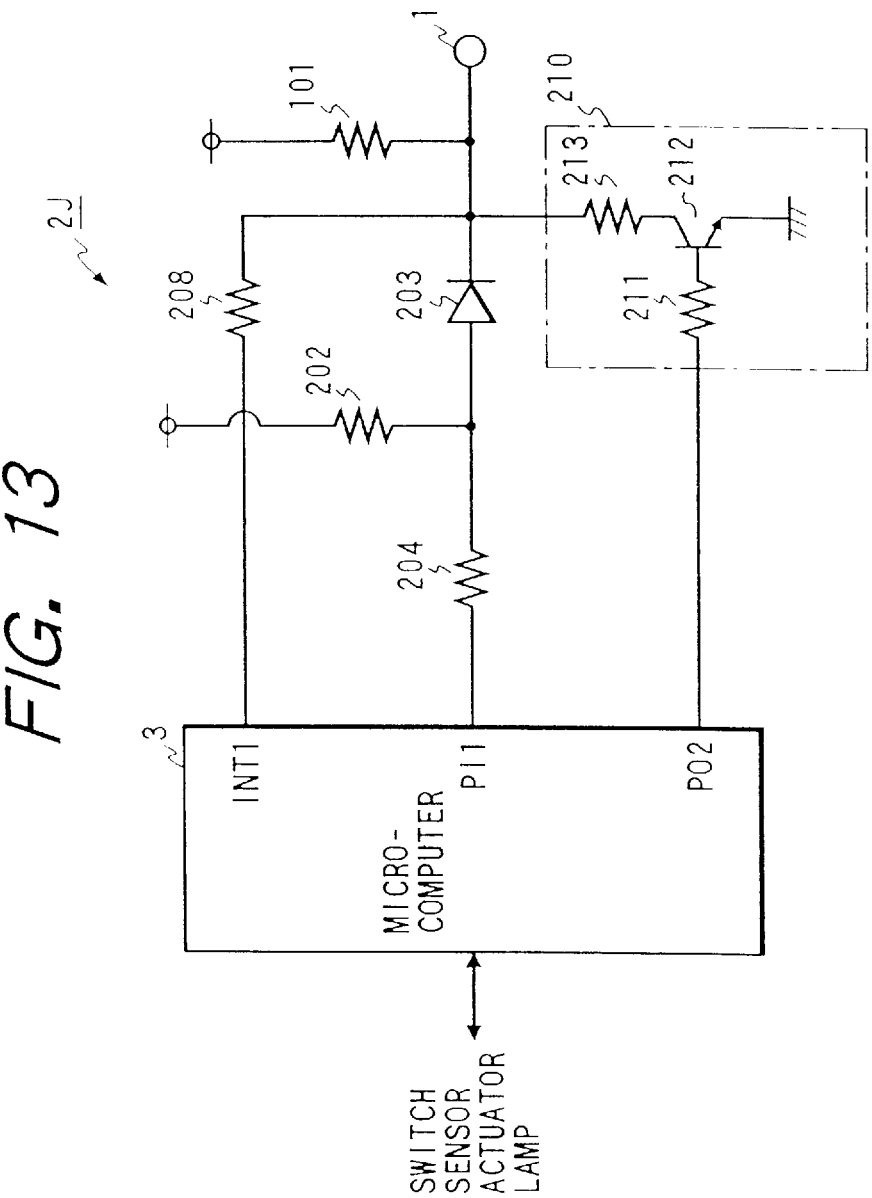

[5,774,817]

COMMUNICATION CIRCUIT FOR LOCAL AREA NETWORK

BACKGROUND OF THE INVENTION

1. Field of the Invention

This invention relates to a communication circuit for a node in a local area network (LAN).

2. Description of the Prior Art

A typical local area network (LAN) for an automotive vehicle has a plurality of nodes connected by a communication bus. Serial-form data can be transmitted among the nodes via the communication bus. The nodes decode received data into specific instructions, and control various actuators and lamps in response to the specific instructions. For example, the control of the actuators and the lamps results in door locking/unlocking control, vent window control, power window control, power seat control, seat heater control, and lamp control.

In the typical LAN, each of the nodes includes a communication circuit and a microcomputer. The communication circuit serves to transmit and receive data to and from the communication bus. The microcomputer receives data via the communication circuit, and decodes the received data into specific instructions. Various actuators and lamps assigned to the node are controlled by the microcomputer in response to the specific instructions. In the case where the result of the decoding of the received data indicates that a given code word should be returned, the microcomputer reads out the given code word from an internal memory and then transmits the given code word to the communication bus via the communication circuit. When the microcomputer receives effective information from a switch or a sensor assigned to the node, the microcomputer encodes the effective information into a corresponding code word and then transmits the code word to the communication bus via the communication circuit.

The typical LAN is powered by a battery mounted on the automotive vehicle. The LAN fails when the battery is excessively discharged. Accordingly, it is desirable to reduce the rate of power consumption by the LAN. In the typical LAN, each node tends to be exposed to a backward current and a transient current from the communication bus. In some cases, such a backward current and a transient current interfere with communication or break parts of the node.

Japanese published unexamined patent application 4-24140 discloses a multiplex communication system having receiving stations and transmitting stations connected by a communication bus. A junction between each of the transmitting stations and the communication bus is provided with a switch. When power is fed to the related transmitting station, the switch enables the connection between the transmitting station and the communication bus. In the absence of power feed to the related transmitting station, the switch breaks the connection between the transmitting station and the communication bus.

Japanese published unexamined patent application 4-63744 discloses a multiplex transmission system for a vehicle which has a plurality of units located at different positions within the vehicle. In the system of Japanese application 4-63744, the units are connected by a transmission line, and messages can be transmitted among the units via the transmission line in a multiplex transmission format. Each of the units is connected to a load and a device for generating a signal of commanding activation of the load. In the system of Japanese application 4-63744, each of the units includes a main controller, a device for feeding a power supply voltage to the main controller, a device for applying a given bias to the transmission line, and a device for monitoring the transmission line and starting the power-supply-voltage feeding device and the bias applying device upon detection of a load-activation commanding signal or a bias applied to the transmission line. Each of the units further includes a device for deactivating the bias applying device when processing by the main controller ends, and a device for deactivating the power-supply-voltage feeding device when a bias is removed from the transmission line.

SUMMARY OF THE INVENTION

It is an object of this invention to provide an improved communication circuit for a node in a LAN.

A first aspect of this invention provides a circuit arrangement disposed in a node within a local area network and connected to a communication bus within the local area network, the circuit arrangement comprising an input circuit for introducing data from the communication bus into the node; node state detecting means for detecting whether or not the node is in a stand-by state; power feed suspending means for suspending power feed to at least part of the input circuit when the node state detecting means detects that the node is in the stand-by state; power feed restarting means for monitoring a voltage at the communication bus, and restarting the power feed to at least part of the input circuit when the voltage at the communication bus becomes equal to a level indicating reception of data; and a protective circuit for protecting the input circuit from an abnormal current which flows from the communication bus.

A second aspect of this invention is based on the first aspect thereof, and provides a circuit arrangement wherein the local area network comprises a local area network mounted on an automotive vehicle, and the node state detecting means comprises first sub means for detecting whether or not the automotive vehicle is parked, and second sub means for detecting that the node is in the stand-by state when the first sub means detects that the automotive vehicle is parked.

A third aspect of this invention is based on the second aspect thereof, and provides a circuit arrangement wherein the node state detecting means is operative for detecting that the automotive vehicle is parked on the basis of a logical product between a condition where all doors of the automotive vehicle are closed and a condition where an ignition switch is in an off position or an ignition key is out of a normal position.

A fourth aspect of this Invention is based on the second aspect thereof, and provides a circuit arrangement wherein the node state detecting means is operative for detecting that the automotive vehicle is parked on the basis of a continuation of a logical product between a condition where all doors of the automotive vehicle are closed and a condition where an ignition switch is in an off position or an ignition key is out of a normal position for a predetermined time.

A fifth aspect of this invention is based on the first aspect thereof, and provides a circuit arrangement wherein the power feed suspending means is operative for suspending power feed to the input circuit when the node state detecting means detects that the node is in the stand-by state.

A sixth aspect of this invention is based on the fifth aspect thereof, and provides a circuit arrangement further comprising a microcomputer having an output port connected to the input circuit, means for feeding electric power to the input circuit via the output port of the microcomputer, and means for setting the output port of the microcomputer to an off state when the node state detecting means detects that the node is In the stand-by state.

A seventh aspect of this invention is based on the fifth aspect thereof, and provides a circuit arrangement wherein the power feed suspending means comprises a switch connected between the input circuit and a power supply source, and means for setting the switch to an off state when the node state detecting means detects that the node is in the stand-by state.

An eighth aspect of this invention is based on the fifth aspect thereof, and provides a circuit arrangement wherein the input circuit comprises means for generating a reference voltage, means for generating an input signal in response to a voltage at the communication bus, and a comparator for comparing the input signal with the reference voltage to decide a logic level of the voltage at the communication bus.

A ninth aspect of this invention is based on the sixth aspect thereof, and provides a circuit arrangement wherein the input circuit comprises an input port of the microcomputer.

A tenth aspect of this invention is based on the first aspect thereof, and provides a circuit arrangement wherein the protective circuit comprises a diode interposed between the input circuit and the communication bus for blocking a backward current from the communication bus toward the input circuit.

An eleventh aspect of this invention is based on the first aspect thereof, and provides a circuit arrangement wherein the protective circuit comprises a diode interposed between the input circuit and the communication bus for blocking a backward current from the communication bus toward the input circuit, and a resistor connected in series with the diode.

A twelfth aspect of this invention is based on the first aspect thereof, and provides a circuit arrangement wherein the protective circuit comprises a diode interposed between the input circuit and the communication bus for blocking a backward current from the communication bus toward the input circuit, and a line buffer connected in series with the diode.

A thirteenth aspect of this invention is based on the tenth aspect thereof, and provides a circuit arrangement further comprising a temperature compensating circuit for compensating a temperature-dependent variation in a forward voltage of the diode.

A fourteenth aspect of this invention is based on the thirteenth aspect thereof, and provides a circuit arrangement wherein the input circuit comprises means for generating a reference voltage, means for generating an input signal in response to a voltage at the communication bus, and a comparator for comparing the input signal with the reference voltage to decide a logic level of the voltage at the communication bus, and wherein the temperature compensating circuit comprises a diode connected in series with the reference-voltage generating means for changing the reference voltage in accordance with a variation in a forward voltage thereof.

A fifteenth aspect of this invention is based on the sixth aspect thereof, and provides a circuit arrangement wherein the power feed suspending means comprises means for setting the microcomputer to a sleep state when the node state detecting means detects that the node is in the stand-by state.

A sixteenth aspect of this invention provides a circuit arrangement disposed in a node within a local area network and connected to a communication bus within the local area network, the circuit arrangement comprising an input circuit for introducing data from the communication bus into the node; a microcomputer for controlling processing in the node; and a diode for protecting the input circuit from an abnormal current which flows from the communication bus; wherein the microcomputer includes an input port for receiving data, an output port for outputting data, node state detecting means for detecting whether or not the node is in a stand-by state, power feed suspending means for suspending power feed to at least part of the input circuit when the node state detecting means detects that the node is in the stand-by state, and power feed restarting means for monitoring a voltage at the communication bus, and restarting the power feed to at least part of the input circuit when the voltage at the communication bus becomes equal to a level indicating reception of data; and wherein a current path is formed between the output port of the microcomputer and the communication bus via the diode.

A seventeenth aspect of this invention provides a node for a local area network having a communication bus which comprises an input section; and means connected between the communication bus and the input section for limiting a current between the communication bus and the input section to a single direction.

An eighteenth aspect of this invention is based on the seventeenth aspect thereof, and provides a node wherein said means comprises means for blocking a current from the communication bus toward the input section.

BRIEF DESCRIPTION OF THE DRAWINGS

FIG. 13 is a diagram of a communication circuit and a microcomputer according to a tenth embodiment of this invention.

DESCRIPTION OF THE PREFERRED EMBODIMENTS

First Embodiment

Figure 1:
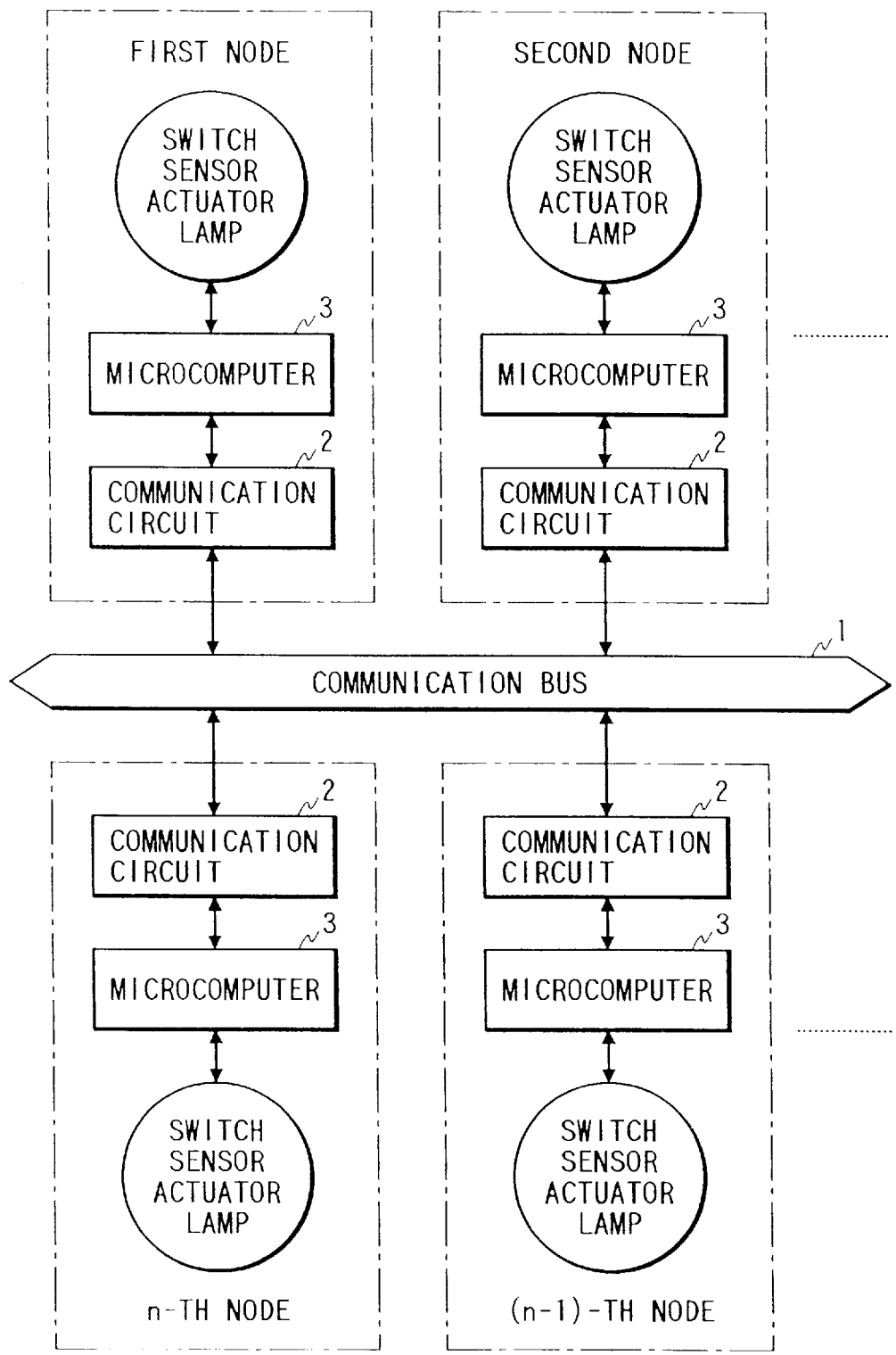
FIG. 1 is a block diagram of a multiplex communication system including a LAN according to a first embodiment of this invention.

With reference to FIG. 1, a multiplex communication system for an automotive vehicle includes a LAN (local area network) in which a plurality of nodes are connected by a common communication bus 1. Serial-form data can be transmitted among the nodes via the communication bus 1. The nodes are sequentially numbered as a first node, a second node, ..., an (n–1)-th node, and an n-th node. Each of the nodes has a communication circuit 2 connected to the communication bus 1, a microcomputer 3 connected to the communication circuit 2, and devices (for example, switches, sensors, actuators, and lamps) connected to the microcomputer 3.

Figure 2:
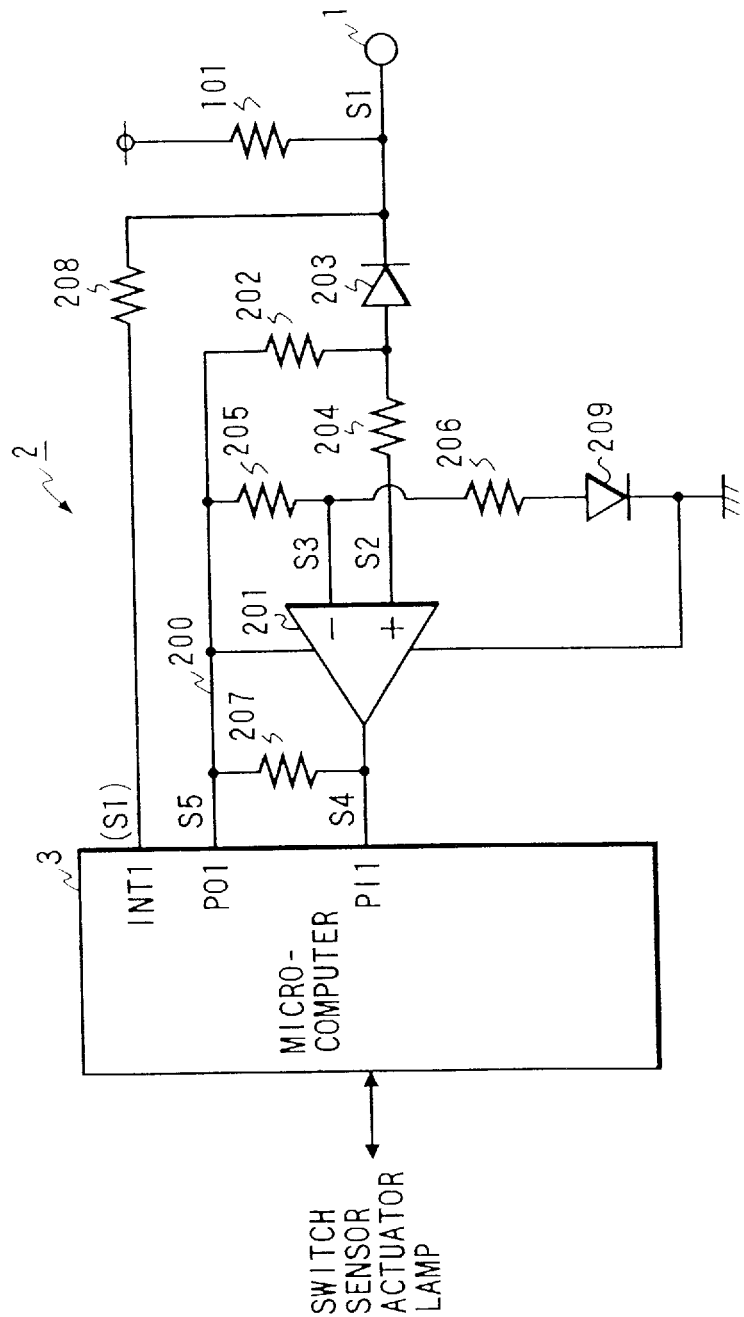
FIG. 2 is a diagram of a communication circuit and a microcomputer in the system of FIG. 1.

With reference to FIG. 2, the communication circuit 2 includes a resistor 101 connected between a positive voltage line and the communication bus 1. The resistor 101 serves as a pull-up resistor for fixing a voltage level of the communication bus 1.

The multiplex communication system is designed so that the voltage or the signal level S1 at the communication bus 1 will be equal to a logic "H" level when transmitted data is absent from the communication bus 1, that is, when stand-by conditions are present.

With reference to FIG. 2, the communication circuit 2 includes an operational amplifier forming a comparator 201. The positive power supply terminal of the comparator 201 is connected to an output port PO1 of the microcomputer 3 via a power feed line 200. The negative power supply terminal of the comparator 201 is grounded. Accordingly, the comparator 201 can be activated by electric power fed from the output port PO1 of the microcomputer 3. Specifically, the comparator 201 is activated when a voltage S5 outputted from the microcomputer 3 via the output port PO1 assumes a high level (corresponding to a power supply voltage of, for example, 5 V or 12 V).

The inverting input terminal of the comparator 201 is connected to one ends of resistors 205 and 206. The other end of the resistor 205 is connected via the power feed line 200 to the output port PO1 of the microcomputer 3. The other end of the resistor 206 is connected to the anode of a diode 209. The cathode of the diode 209 is grounded. The resistors 205 and 206 compose a voltage dividing circuit which generates a predetermined reference voltage from the voltage output S5 of the microcomputer 3. The predetermined reference voltage also depends on the characteristics of the diode 209. The inverting input terminal of the comparator 201 is subjected to the predetermined reference voltage. The comparator 201 and the voltage dividing circuit compose an input circuit within the communication circuit 2.

The non-inverting input terminal of the comparator 201 is connected to one end of a resistor 204. The other end of the resistor 204 is connected to the anode of a diode 203. The cathode of the diode 203 is connected to the communication bus 1. The non-inverting input terminal of the comparator 201 receives an input signal S2 from the communication bus 1 via the diode 203 and the resistor 204. The input signal S2 corresponds to the voltage S1 at the communication bus 1. The diode 203 and the resistor 204 compose a protective device for the input circuit within the communication circuit 2.

The output terminal of the comparator 201 leads to an input port PI1 of the microcomputer 3. Accordingly, the comparator 201 outputs a comparison-result signal S4 to the input port PI1 of the microcomputer 3. The output terminal of the comparator 201 is connected via a resistor 207 to the power feed line 200. The resistor 207 serves as a pull-up resistor for fixing a voltage level of the output signal S4 of the comparator 201. It should be noted that the resistor 207 may be omitted when the comparator 201 is of the totem pole type or the output-resistor built-in type.

One end of a resistor 202 is connected to the junction between the diode 203 and the resistor 204. The other end of the resistor 202 is connected via the power feed line 200 to the output port PO1 of the microcomputer 3. The resistor 202 serves as a pull-up resistor for fixing a voltage level of the input signal S2.

An interruption port INT1 of the microcomputer 3 is connected to the communication bus 1 via a resistor 208. The resistor 208 limits a current flowing into the interruption port INT1 of the microcomputer 3 to protect the latter.

The comparator 201 detects or decides the logic level of the input signal S2 which corresponds to the voltage S1 at the communication bus 1. Specifically, the device 201 compares the voltage of the input signal S2 with the predetermined reference voltage S3. When the voltage of the input signal S2 is lower than the predetermined reference voltage S3, the output signal S4 of the comparator 201 assumes a logic "L" level. When the voltage of the input signal S2 is equal to or higher than the predetermined reference voltage S3, the output signal S4 of the comparator 201 assumes a logic "H" level.

The diode 203 blocks a backward current from the communication bus 1, thereby protecting the comparator 201. The resistor 204 limits a current flowing into the non-inverting input terminal of the comparator 201.

A consideration will now be given of a supposed arrangement where the output port PO1 of the microcomputer 3 is coupled via the resistor 202 with the communication bus 1 without providing the diode 203. In the case where the voltage S1 at the communication bus 1 is equal to the logic "H" level (corresponding to an inactive state of the communication bus 1), when the present node including the supposed arrangement falls into a stand-by state, the output port PO1 of the microcomputer 3 assumes a logic "L" state or a grounded state so that a backward current flows from the communication bus 1 into the output port PO1 of the microcomputer 3 in the supposed arrangement. The flow of the backward current causes the voltage S1 at the communication bus 1 to drop to a logic "L" level corresponding to an active state of the communication bus 1. The drop of the voltage S1 to the logic "L" level tends to interfere with communication by another node, and to force another node to be out of a stand-by state even if the stand-by state is desired.

On the other hand, in the embodiment of this invention, the diode 203 is provided between the communication bus 1 and the output port PO1 of the microcomputer 3. The diode 203 blocks a backward current from the communication bus 1 toward the output port PO1 of the microcomputer 3. Accordingly, the voltage S1 at the communication bus 1 is independent of whether the present node falls into a stand-by state. Thus, it is possible to prevent interference with communication by another node, and to prevent another node to be forced out of a stand-by state.

The diode 203 operates similarly and provides a similar advantage when the output port PO1 of the microcomputer 3 is short-circuited to the ground.

The forward voltage of the diode 203 varies in accordance with the temperature thereof. Therefore, the voltage of the input signal S2 has a temperature-dependent variation. The diode 209 provides a similar temperature-dependent variation of the predetermined reference voltage S3, thereby compensating for the temperature-dependent variation of the input signal S2 regarding the decision of the logic level of the input signal S2 by the comparator 201. Accordingly, it is possible to prevent the temperature-dependent variation of the input signal S2 from adversely affecting the decision of the logic level of the input signal S2 by the comparator 201. It is preferable that the diodes 203 and 209 have similar temperature-dependent characteristics.

The communication circuit 2 operates as follows. In the case where the voltage S1 at the communication bus 1 is equal to the logic "L" level or the ground level, when the voltage output S5 of the microcomputer 3 which appears at its output port PO1 assumes the high level, a forward current flows from the output port PO1 to the communication bus 1 via the resistor 202 and the diode 203. At the same time, a partial voltage determined by the ratio between the resistances of the resistor 202 and the diode 203 or a partial voltage appearing across the diode 203 constitutes the input signal S2 which is applied to the non-inverting input terminal of the comparator 201 via the resistor 204. Under these conditions, the voltage of the input signal S2 is relatively low.

In the case where the voltage S1 at the communication bus 1 is equal to the logic "H" level (corresponding to a power supply voltage of, for example, 5 V or 12 V), when the voltage output S5 of the microcomputer 3 which appears at its output port PO1 assumes the high level, the voltage S1 is higher than a level equal to the voltage S5 minus a possible voltage drop across the diode 203 so that a forward current does not flow toward the communication bus 1 via the diode 203. Accordingly, the voltage at the anode of the diode 203 which is pulled up by the resistor 202 constitutes the input signal S2 being applied to the non-inverting input terminal of the comparator 201 via the resistor 204. Under these conditions, the voltage of the input signal S2 is relatively high.

In this way, the voltage of the input signal S2 depends on the logic state of the voltage S1 at the communication bus 1. As previously described, the forward voltage of the diode 203 varies in accordance with the temperature thereof. Therefore, the voltage of the input signal S2 has a temperature-dependent variation. The diode 209 provides a similar temperature-dependent variation of the predetermined reference voltage S3, thereby compensating for the temperature-dependent variation of the input signal S2 regarding the decision of the logic level of the input signal S2 by the comparator 201. Accordingly, it is possible to prevent the temperature-dependent variation of the input signal S2 from adversely affecting the decision of the logic level of the input signal S2 by the comparator 201.

As previously described, the interruption port INT1 of the microcomputer 3 is connected to the communication bus 1 via the resistor 208. The microcomputer 3 monitors conditions of the communication bus 1 via the interruption port INT1. As previously described, the voltage S1 at the communication bus 1 is equal to the logic "H" level when transmitted data is absent from the communication bus 1, that is, when stand-by conditions are present. The microcomputer 3 receives an interruption command via the interruption port INT1 when the voltage S1 at the communication bus 1 changes to a logic "L" level. As will be described later, upon the reception of the interruption command, the microcomputer 3 starts the communication circuit 2 to enable the reception of data from the communication bus 1.

Figure 3:
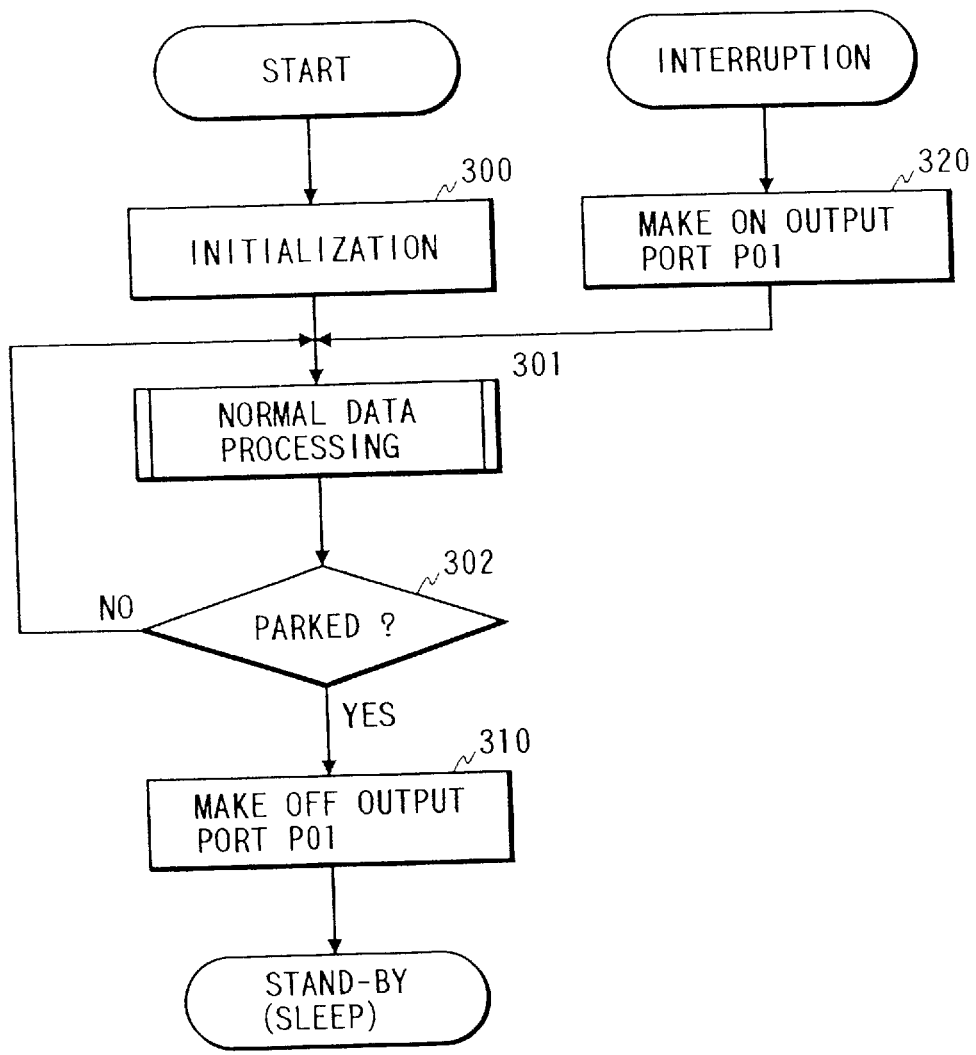
FIG. 3 is a flowchart of a segment of a program for controlling the microcomputer in FIG. 2.

The microcomputer 3 includes a combination of an interface circuit, a ROM, a RAM, and a CPU. The microcomputer 3 operates in accordance with a program stored in the ROM. FIG. 3 is a flowchart of a segment of the program which relates to on/off control of the output port PO1.

With reference to FIG. 3, a first step 300 of the program segment is executed when the multiplex communication system is started. The step 300 activates necessary drivers and other circuits (including the communication circuit 2). Furthermore, the step 300 initializes variables provided in the RAM within the microcomputer 3. After the step 300, the program advances to a step 301.

The step 301 executes a process of transmitting and receiving data to and from the communication bus 1 via the communication circuit 2. After the step 301, the program advances to a step 302.

The step 302 judges whether or not the automotive vehicle is parked. Specifically, the step 302 detects whether or not all doors of the automotive vehicle are closed by referring to output signals of sensors connected to the microcomputer 3 or data transmitted from another node. In addition, the step 302 detects whether or not an ignition (IG) switch is in an off position by referring to an output signal of the ignition switch connected to the microcomputer 3 or data transmitted from another node. Furthermore, the step 302 detects whether or not an ignition (IG) key is out of its normal position by referring to an output signal of a sensor connected to the microcomputer 3 or data transmitted from another node. In the case where all the doors of the automotive vehicle remains closed and the ignition switch remains in its off position for a given interval or longer, the step 302 judges the automotive vehicle to be parked. In the case where all the doors of the automotive vehicle remains closed and the ignition key remains out of its normal position for the given interval or longer, the step 302 judges the automotive vehicle to be parked. In other cases, the step 302 judges the automotive vehicle to be not parked. The given interval is equal to, for example, 30 seconds. When the automotive vehicle is judged to be parked, the program advances from the step 302 to a step 310. When the automotive vehicle is judged to be not parked, the program returns from the step 302 to the step 301.

The step 310 changes the output port PO1 to an off state. In other words, the step 310 nullifies the voltage S5 which is outputted from the microcomputer 3 via the output port PO1. As a result, power feed to the input circuit within the communication circuit 2 is suspended. Thus, the communication circuit 2 is deactivated.

After the step 310, the microcomputer 3 falls into a stand-by state or a sleep state. When the microcomputer 3 falls into the sleep state, an oscillator connected to or provided in the microcomputer 3 is deactivated. The oscillator can be restarted by a starting command. When the microcomputer 3 falls into the sleep state, the frequency of oscillation of the oscillator may be lowered to reduce a power consumption rate. In this way, a dark current is reduced during the stand-by state.

Even in the case where the microcomputer 3 is in the stand-by state (the sleep state), the microcomputer 3 monitors conditions of the communication bus 1 via the interruption port INT1 as previously described. When the voltage S1 at the communication bus 1 changes to the logic "L" level (the data reception level indicating the presence of transmitted data), the microcomputer 3 recognizes the reception of an interruption command via the interruption port INT1.

A step 320 of the program segment is executed in response to the reception of the interruption command. The step 310 changes the output port PO1 to an on state. In other words, the step 310 changes the voltage S5, which is outputted from the microcomputer 3 via the output port PO1, to the high level. As a result, power feed to the input circuit within the communication circuit 2 is restarted. Thus, the communication circuit 2 is activated again. After the step 320, the program advances to the step 301.

Figure 4:
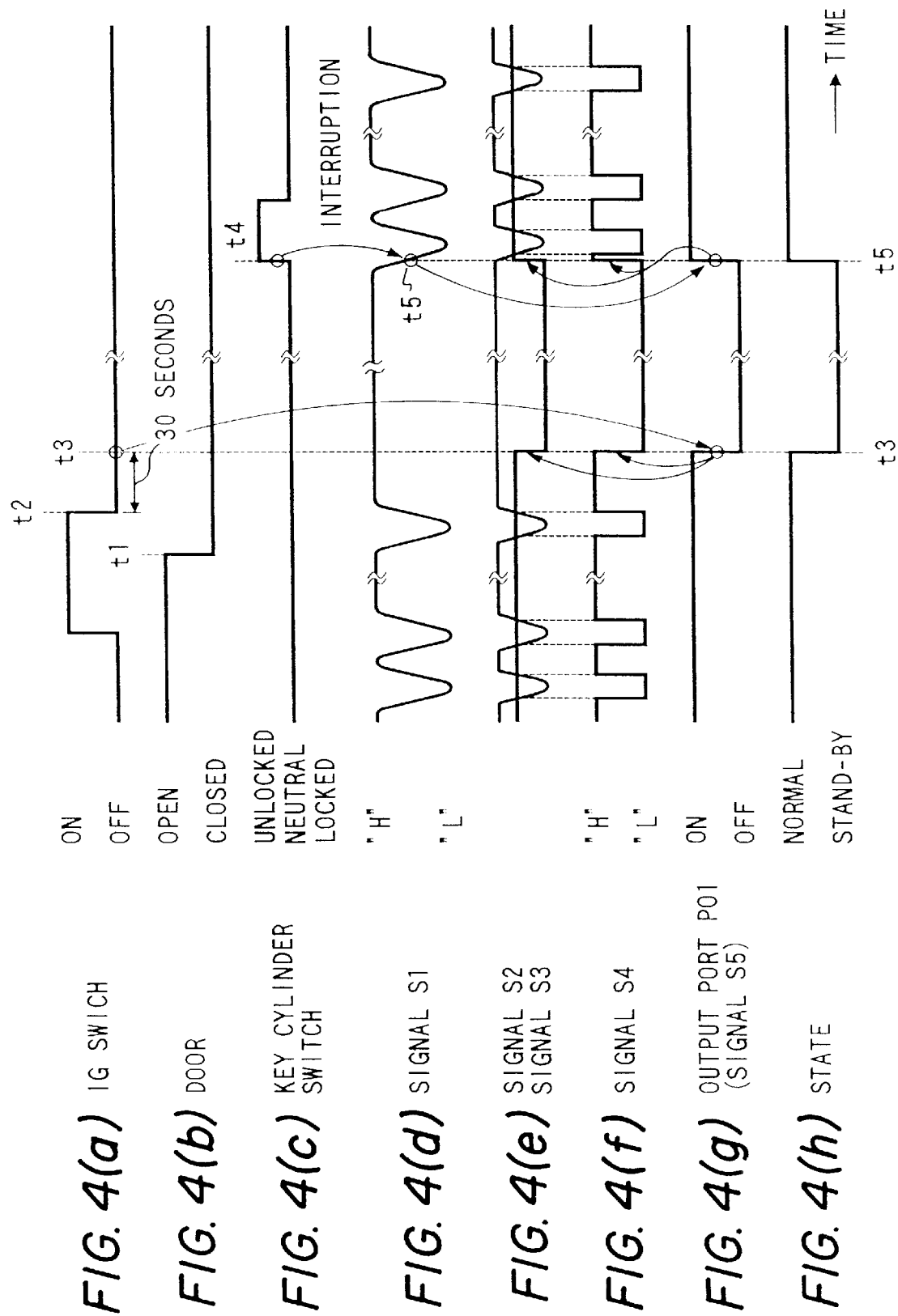
FIGS. 4($a$)–4($h$) are the time-domain diagrams of conditions of signals and conditions of devices in the system of FIG. 1.

With reference to FIG. FIGS. 4(a)–4(h), operation of the communication circuit 2 will be further described. It is now assumed that the ignition switch changes between its on state and its off state as shown in FIG. 4(a), and that all the doors of the automotive vehicle are closed and opened as shown in FIG. 4(b). The microcomputer 3 detects the conditions of the ignition switch and the conditions of the doors by referring to output signals of the ignition switch and sensors connected to the microcomputer 3 or data transmitted from another node. It is now assumed that a key cylinder switch in the automotive vehicle changes its position (its state) as shown in FIG. 4(c). The microcomputer 3 detects the conditions of the key cylinder switch by referring to data transmitted from another node.

The FIG. 4(d) shows an example of a time-domain change in the signal voltage S1 at the communication bus 1. The input signal S2, which is derived from the signal voltage S1, has a waveform such as shown in FIG. 4(e). The diode 203 has a clamping function by which the peak voltage of the input signal S2 is limited as shown in FIG. 4(e). While the communication circuit 2 remains activated, the predetermined reference voltage S3 is substantially constant as shown in FIG. 4(e). The input signal S2 and the predetermined reference voltage S3 are applied to the comparator 201, being compared with each other thereby. As shown in FIG. 4(f), the output signal S4 of the comparator 201 changes between the logic "L" level and the logic "H" level in response to the result of the comparison between the input signal S2 and the predetermined reference voltage S3. As long as the decision of the logic level of the input signal S2 by the comparator 201 is correct, the logic level of the output signal S4 of the comparator 201 accurately corresponds to the logic level of the signal voltage S1 at the communication bus 1.

The FIG. 4(g) shows an example of a time-domain change in the signal S5 outputted from the microcomputer 3 via the output port PO1, that is, a time-domain change in the state of the output port PO1. As previously described, power feed to the input circuit within the communication circuit 2 is enabled and inhibited (suspended) when the output port PO1 assumes the on state and the off state respectively. As shown in FIG. 4(h), the present node moves into a normal state and a stand-by state when the output port PO1 assumes the on state and the off state respectively.

It is now assumed that the signals S1, S2, S3, and S4 change in time domain as shown in FIGS. 4(d), 4(e), and 4(f), and that all the doors of the automotive vehicle are closed at a moment t1 before the ignition switch changes from its on state to its off state at a subsequent moment t2 as shown in FIGS. 4(a) and 4(b). As previously described, the microcomputer 3 detects that all the doors of the automotive vehicle are closed by referring to output signals of sensors connected to the microcomputer 3 or data transmitted from another node. In addition, the microcomputer 3 detects the change of the ignition switch to its off state by referring to an output signal of the ignition switch connected to the microcomputer 3 or data transmitted from another node. In the case where all the doors of the automotive vehicle remains closed and the ignition switch remains in its off position for the given interval (for example, 30 seconds) from the moment t2, the microcomputer 3 judges the automotive vehicle to be parked at a moment t3 (see FIG. 4(a). When the automotive vehicle is judged to be parked, the microcomputer 3 changes its output port PO1 to the off state and thereby drops and nullifies the voltage S5 outputted from the microcomputer 3 via its output port PO1 as shown in FIG. 4(g). Therefore, as suggested in FIGS. 4(e) and 4(f), power feed to the input circuit within the communication circuit 2 is suspended at the moment t3. As a result, the function of receiving data via the input circuit within the communication circuit 2 is disabled. The suspension of the power feed to the input circuit within the communication circuit 2 results a reduction in the rate of power consumption and also a reduction in a dark current.

It is now assumed that the key cylinder switch is changed from its neutral position to its unlocked position at a moment t4 after the moment t3 as shown in FIG. 4(c). A node connected to the key cylinder switch detects the change of the key cylinder switch to its unlocked position, transmitting related data to the present node via the communication bus 1. At a moment t5 immediately following the moment t4, the microcomputer 3 receives an interruption command via its interruption port INT1 in response to the transmitted data (see FIG. 4(d). Thus, at the moment t5, the microcomputer 3 changes its output port PO1 to the on state in response to the interruption command, and thereby outputs the high-level voltage S5 via its output port PO1 as shown in FIG. 4(g). Therefore, as suggested in FIGS. 4(e) and 4(f), the power feed to the input circuit within the communication circuit 2 is restarted at the moment t5. As a result, the function of receiving data via the input circuit within the communication circuit 2 is enabled. Then, normal data processing is executed in a manner such as shown in FIGS. 4(d), 4(e), and 4(f).

As previously described, when the microcomputer 3 judges the automotive vehicle to be parked (see the moment t3 in FIGS. 4(a)–4(h), the power feed to the input circuit within the communication circuit 2 is suspended. The microcomputer 3 continues the suspension of the power feed to the input circuit within the communication circuit 2 until the microcomputer 3 receives an interruption command via its interruption port INT1 (see the moment t5 in FIGS. 4(a)–4(h). As previously described, the suspension of the power feed to the input circuit within the communication circuit 2 results a reduction in the rate of power consumption and also a reduction in a dark current.

Under conditions where the power feed to the input circuit within the communication circuit 2 remains suspended and the function of receiving data via the input circuit within the communication circuit 2 continues to be disabled, when the voltage S1 at the communication bus 1 becomes equal to the data reception level indicating the presence of transmitted data, an interruption command is applied to the interruption port INT1 of the microcomputer 3 in response to the voltage S1 at the communication bus 1. Then, the microcomputer 3 restarts the power feed to the input circuit within the communication circuit 2 in response to the interruption command. Accordingly, the multiplex communication system is prevented from failing in its desired function (the data communication) even if the power feed to the input circuit within the communication circuit 2 is suspended.

As previously described, in the case where all the doors of the automotive vehicle remains closed and the ignition switch remains in its off position for the given interval (for example, 30 seconds) or longer, the microcomputer 3 judges the automotive vehicle to be parked. In the case where all the doors of the automotive vehicle remains closed and the ignition key remains out of its normal position for the given interval (for example, 30 seconds) or longer, the microcomputer 3 judges the automotive vehicle to be parked. This design enables the microcomputer 3 to surely detect a change of the automotive vehicle to parking conditions.

The microcomputer 3 may judge the automotive vehicle to be parked In the case where all the doors of the automotive vehicle are closed and the ignition switch falls into its off position, or in the case where all the doors of the automotive vehicle are closed and the ignition key moves out of its normal position.

As previously described, the microcomputer 3 can feed electric power to the Input circuit within the communication circuit 2 via its output port PO1. The microcomputer 3 enables and suspends the power feed to the input circuit within the communication circuit 2 by changing the output port PO1 to the on state and the off state respectively. Thus, the power feed circuit operating on the input circuit within the communication circuit 2 is simple in structure. Also, the power-feed enabling/suspending means is simple in structure.

The diode 203 and the resistor 204 protect the input circuit within the communication circuit 2 from an incoming abnormal current. In addition, the diode 203 and the resistor 204 prevent the voltage S1 at the communication bus 1 from changing due to a backward current flowing into the present node.

The diode 209 serves as a temperature compensating device which compensates for a temperature-dependent variation of the input signal S2 regarding the decision of the logic level of the input signal S2 by the comparator 201. Accordingly, it is possible to prevent the temperature-dependent variation of the input signal S2 from adversely affecting the decision of the logic level of the input signal S2 by the comparator 201. Thus, the decision of the logic level of the input signal S2 by the comparator 201 is held accurate.

Second Embodiment

Figure 5:
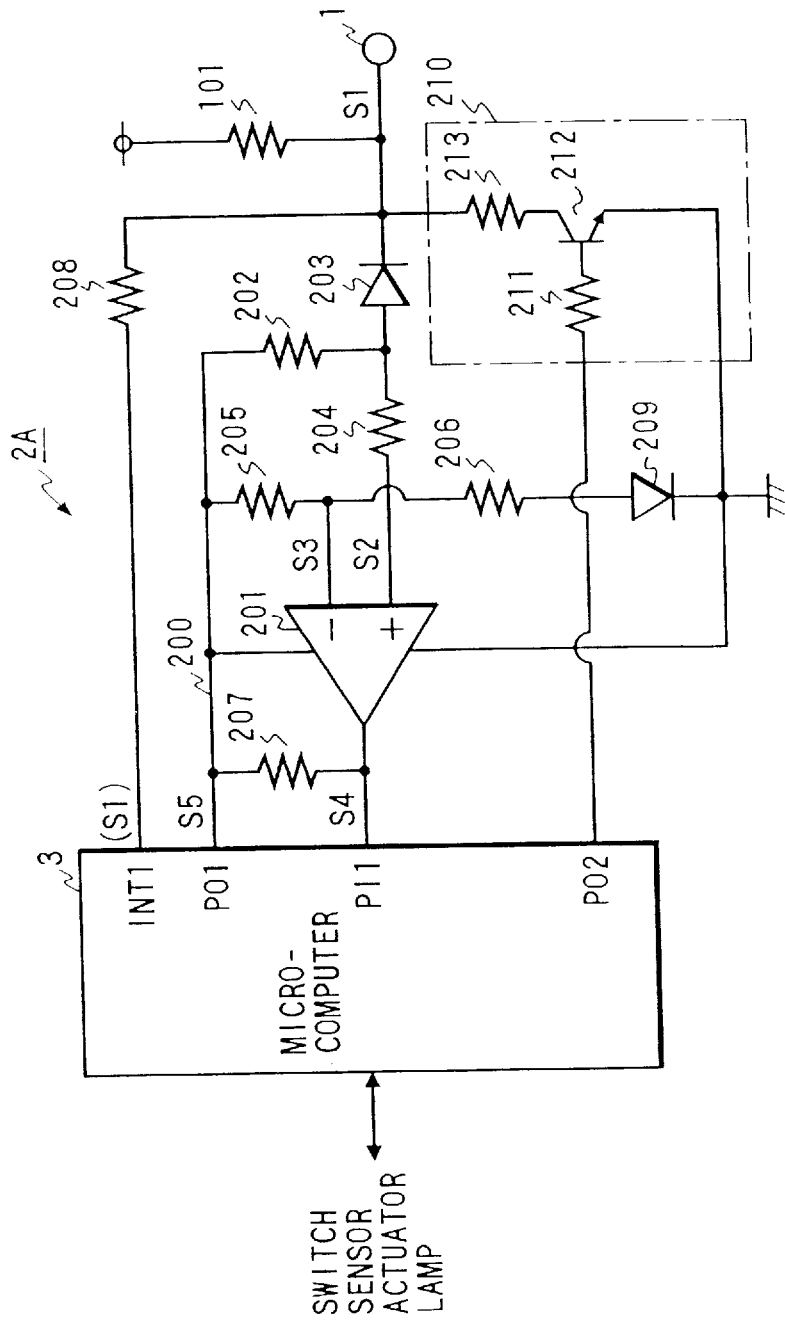
FIG. 5 is a diagram of a communication circuit and a microcomputer according to a second embodiment of this invention.

FIG. 5 shows a second embodiment of this invention which is similar to the embodiment of FIG. 2 except for an additional arrangement indicated hereinafter.

In the embodiment of FIG. 5, a communication circuit 2A includes a driver circuit 210 for enabling the transmission of data to the communication bus 1. The driver circuit 210 has a resistor 211, an NPN transistor 212, and a resistor 213. The base of the transistor 212 is connected to an output port PO2 of the microcomputer 3 via the resistor 211. The emitter of the transistor 212 is grounded. The collector of the transistor 212 is connected to the communication bus 1 via the resistor 213.

When a signal outputted from the microcomputer 3 via its output port PO2 assumes a logic "H" level, the collector-emitter path of the transistor 212 becomes conductive so that the voltage S1 at the communication bus 1 drops to the logic "L" level (the ground level). When the signal outputted from the microcomputer 3 via its output port PO2 assumes a logic "L" level, the collector-emitter path of the transistor 212 becomes non-conductive so that the voltage S1 at the communication bus 1 is normally maintained at the logic "H" level. In this way, data can be transmitted from the microcomputer 3 to the communication bus 1 via the driver circuit 210.

Third Embodiment

Figure 6:
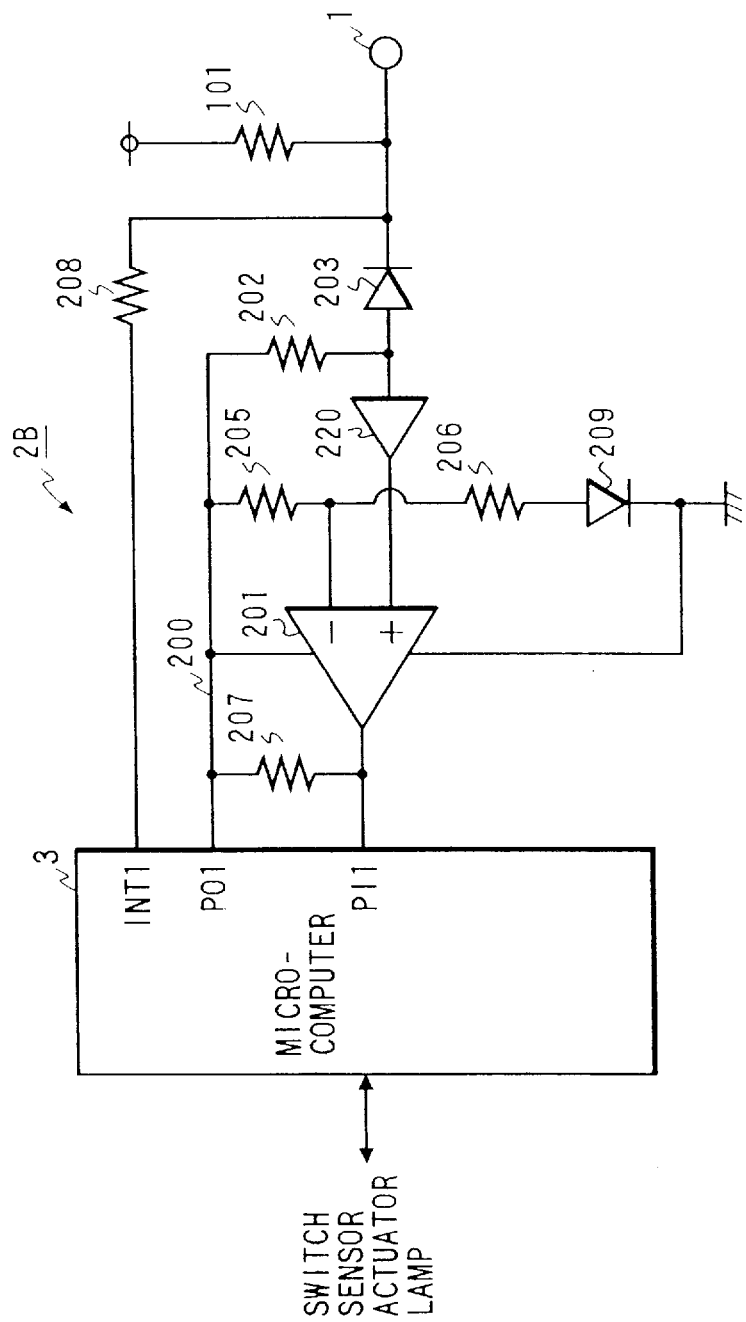
FIG. 6 is a diagram of a communication circuit and a microcomputer according to a third embodiment of this invention.

FIG. 6 shows a third embodiment of this invention which is similar to the embodiment of FIG. 2 except for a design change indicated hereinafter. The embodiment of FIG. 6 includes a communication circuit 2B in place of the communication circuit 2 of FIG. 2. The communication circuit 2B has a line buffer 220 which replaces the resistor 204 of FIG. 2.

It should be noted that the resistor 208 may also be replaced by a line buffer.

Fourth Embodiment

Figure 7:
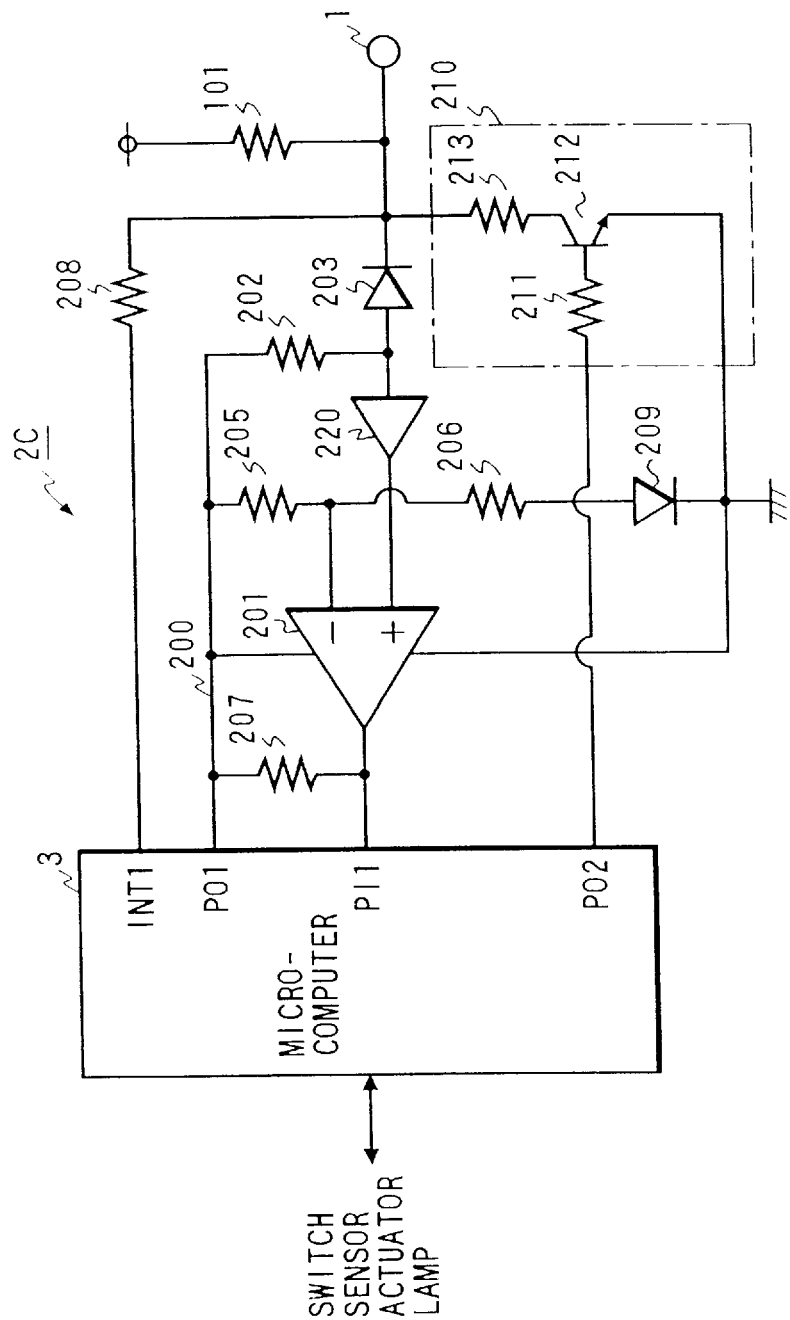
FIG. 7 is a diagram of a communication circuit and a microcomputer according to a fourth embodiment of this invention.

FIG. 7 shows a fourth embodiment of this invention which is similar to the embodiment of FIG. 5 except for a design change indicated hereinafter. The embodiment of FIG. 7 includes a communication circuit 2C in place of the communication circuit 2A of FIG. 5. The communication circuit 2C has a line buffer 220 which replaces the resistor 204 of FIG. 5.

It should be noted that the resistor 208 may also be replaced by a line buffer.

Fifth Embodiment

Figure 8:
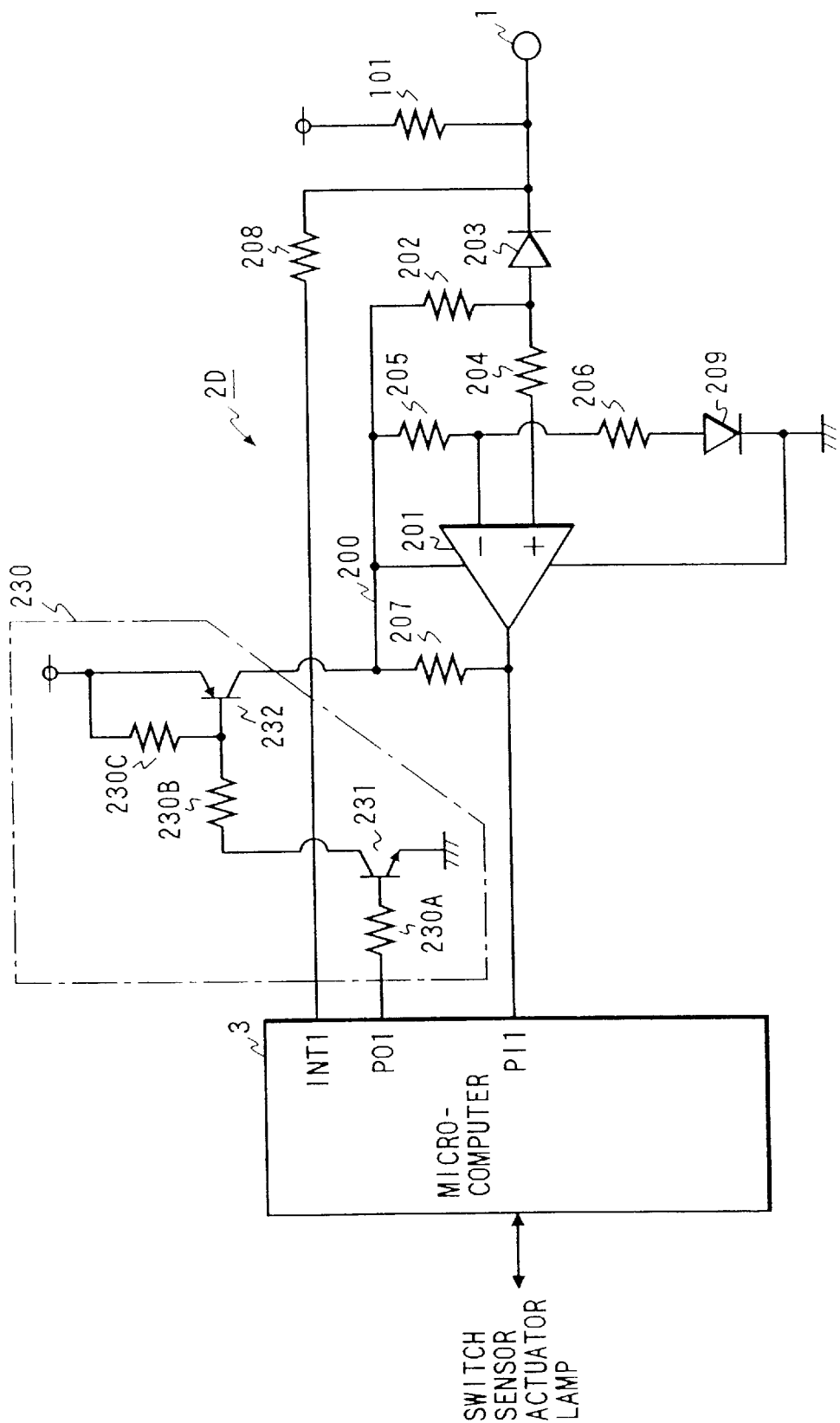
FIG. 8 is a diagram of a communication circuit and a microcomputer according to a fifth embodiment of this invention.

FIG. 8 shows a fifth embodiment of this invention which is similar to the embodiment of FIG. 2 except for a design change indicated hereinafter. The embodiment of FIG. 8 includes a communication circuit 2D in place of the communication circuit 2 of FIG. 2.

As shown in FIG. 8, the communication circuit 2D has a power-supply control circuit 230 composed of an NPN transistor 231, a PNP transistor 232, and resistors 230A, 230B, and 230C. The base of the transistor 231 is connected to the output port PO1 of the microcomputer 3 via the resistor 230A. The emitter of the transistor 231 is grounded. The collector of the transistor 231 is connected to the base of the transistor 232 via the resistor 230B. The base of the transistor 232 is connected to the collector thereof via the resistor 230C. The emitter of the transistor 232 is connected to a positive voltage line. The collector of the transistor 232 is connected to the power feed line 200. It should be noted that the direct connection between the power feed line 200 and the output port PO1 of the microcomputer 3 is absent from the communication circuit 2D.

When a signal outputted from the microcomputer 3 via its output port PO1 assumes a logic "H" level, the collector-emitter path of the transistor 231 and also the collector-emitter path of the transistor 232 become conductive so that electric power is fed from the positive voltage line to the input circuit within the communication circuit 2D. When the signal outputted from the microcomputer 3 via its output port PO1 assumes a logic "L" level, the collector-emitter path of the transistor 231 and also the collector-emitter path of the transistor 232 become non-conductive so that the power feed to the input circuit within the communication circuit 2D is suspended.

Sixth Embodiment

Figure 9:
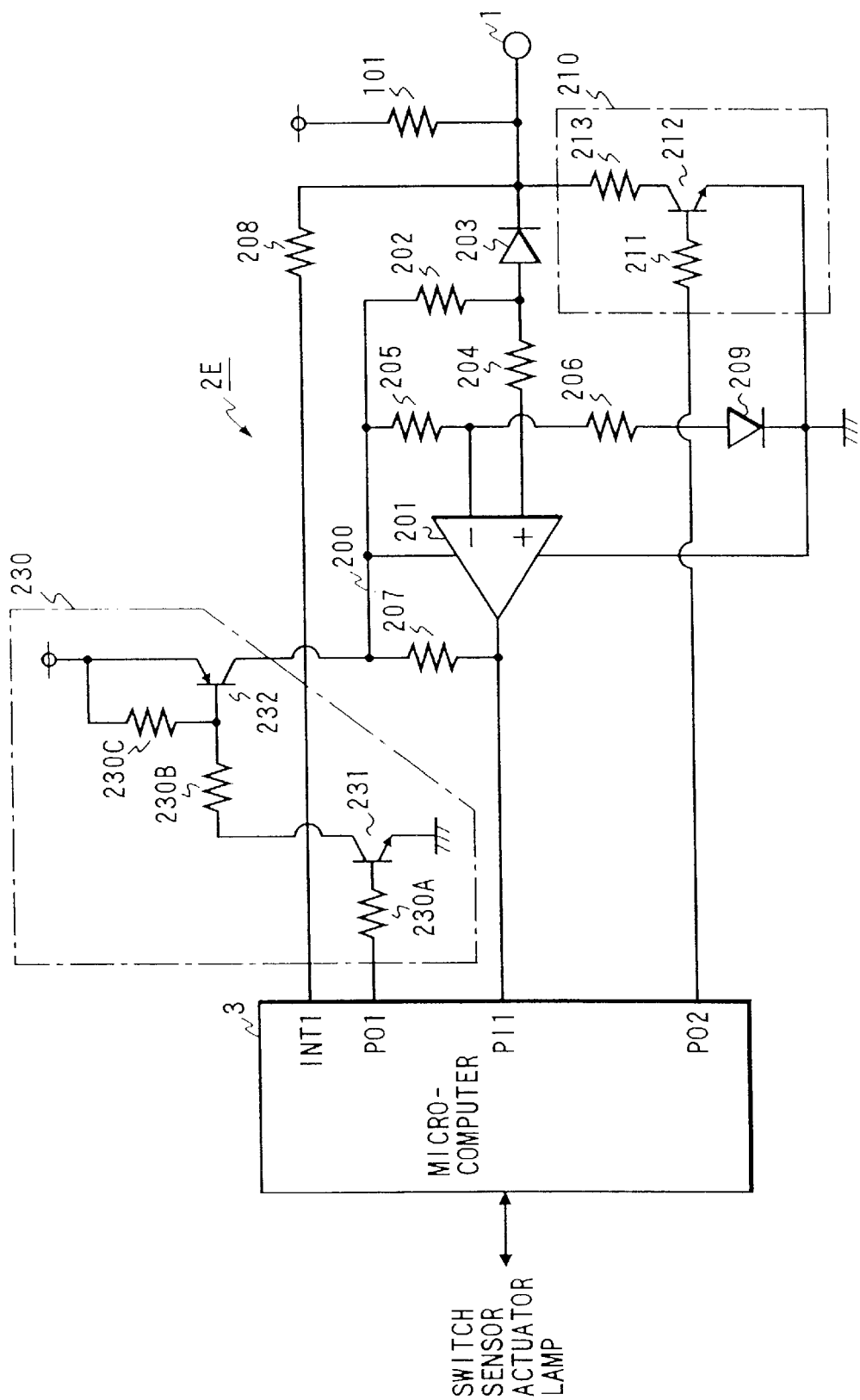
FIG. 9 is a diagram of a communication circuit and a microcomputer according to a sixth embodiment of this invention.

FIG. 9 shows a sixth embodiment of this invention which is similar to the embodiment of FIG. 5 except for a design change indicated hereinafter. The embodiment of FIG. 9 includes a communication circuit 2E in place of the communication circuit 2A of FIG. 5.

As shown in FIG. 9, the communication circuit 2E has a power-supply control circuit 230 composed of an NPN transistor 231, a PNP transistor 232, and resistors 230A, 230B, and 230C. The base of the transistor 231 is connected to the output port PO1 of the microcomputer 3 via the resistor 230A. The emitter of the transistor 231 is grounded.

The collector of the transistor 231 is connected to the base of the transistor 232 via the resistor 230B. The base of the transistor 232 is connected to the collector thereof via the resistor 230C. The emitter of the transistor 232 is connected to a positive voltage line. The collector of the transistor 232 is connected to the power feed line 200. It should be noted that the direct connection between the power feed line 200 and the output port PO1 of the microcomputer 3 is absent from the communication circuit 2E.

When a signal outputted from the microcomputer 3 via its output port PO1 assumes a logic "H" level, the collector-emitter path of the transistor 231 and also the collector-emitter path of the transistor 232 become conductive so that electric power is fed from the positive voltage line to the input circuit within the communication circuit 2E. When the signal outputted from the microcomputer 3 via its output port PO1 assumes a logic "L" level, the collector-emitter path of the transistor 231 and also the collector-emitter path of the transistor 232 become non-conductive so that the power feed to the input circuit within the communication circuit 2E is suspended.

Seventh Embodiment

Figure 10:
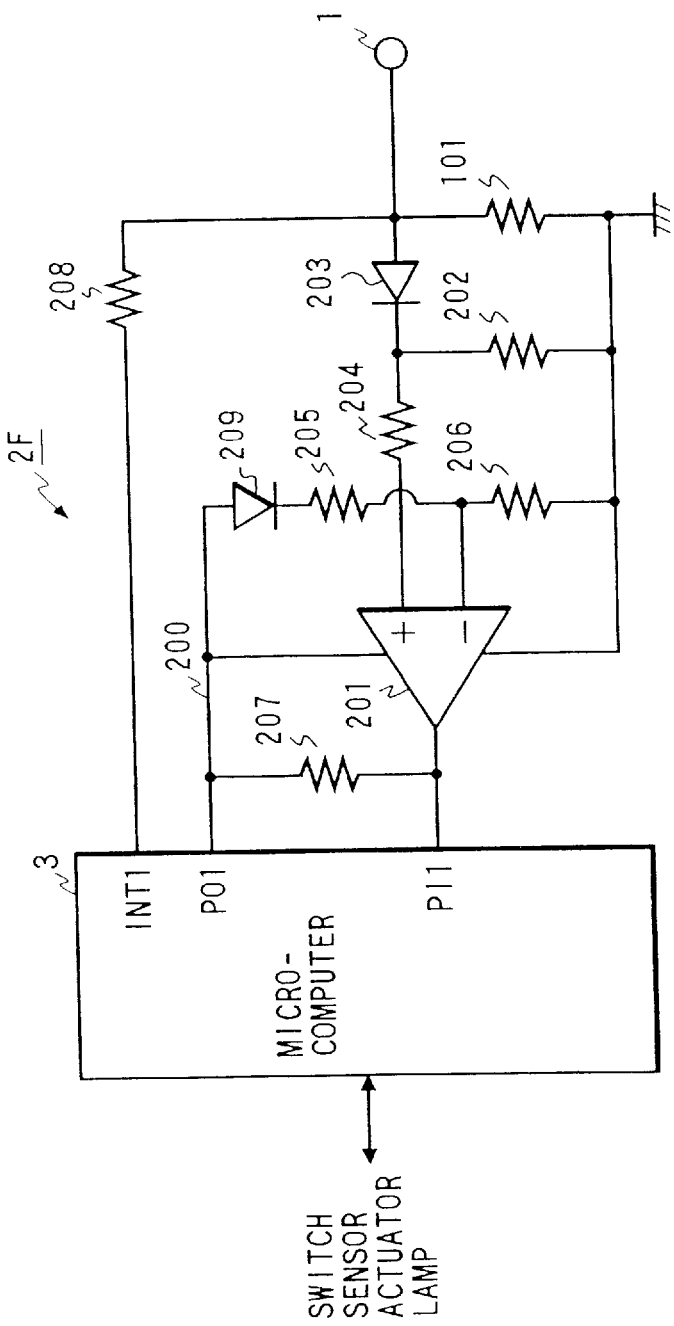
FIG. 10 is a diagram of a communication circuit and a microcomputer according to a seventh embodiment of this invention.

FIG. 10 shows a seventh embodiment of this invention which is similar to the embodiment of FIG. 2 except for a design change indicated hereinafter. The embodiment of FIG. 10 includes a communication circuit 2F in place of the communication circuit 2 of FIG. 2.

As shown in FIG. 10, the communication circuit 2F has a resistor 101 connected between the communication bus 1 and the ground. The resistor 101 serves as a pull-down resistor for fixing a voltage level of the communication bus 1.

The multiplex communication system is designed so that the voltage or the signal level S1 at the communication bus 1 will be equal to a logic "L" level when transmitted data is absent from the communication bus 1, that is, when stand-by conditions are present.

As shown in FIG. 10, the communication circuit 2F has an operational amplifier forming a comparator 201. The positive power supply terminal of the comparator 201 is connected to an output port PO1 of the microcomputer 3 via a power feed line 200. The negative power supply terminal of the comparator 201 is grounded. Accordingly, the comparator 201 can be activated by electric power fed from the output port PO1 of the microcomputer 3. Specifically, the comparator 201 is activated when a voltage S5 outputted from the microcomputer 3 via the output port PO1 assumes a high level (corresponding to a power supply voltage of, for example, 5 V or 12 V).

The inverting input terminal of the comparator 201 is connected to one ends of resistors 205 and 206. The other end of the resistor 205 is connected to a cathode of a diode 209. The anode of the diode 209 is connected via the power feed line 200 to the output port PO1 of the microcomputer 3. The other end of the resistor 206 is grounded. The resistors 205 and 206 compose a voltage dividing circuit which generates a predetermined reference voltage from the voltage output S5 of the microcomputer 3. The predetermined reference voltage also depends on the characteristics of the diode 209. The inverting input terminal of the comparator 201 is subjected to the predetermined reference voltage. The comparator 201 and the voltage dividing circuit compose an input circuit within the communication circuit 2F.

The non-inverting input terminal of the comparator 201 is connected to one end of a resistor 204. The other end of the resistor 204 is connected to the cathode of a diode 203. The anode of the diode 203 is connected to the communication bus 1. The non-inverting input terminal of the comparator 201 receives an input signal S2 from the communication bus 1 via the diode 203 and the resistor 204. The input signal S2 corresponds to the voltage S1 at the communication bus 1. The resistor 204 compose a protective device for the input circuit within the communication circuit 2F.

The output terminal of the comparator 201 leads to an input port PI1 of the microcomputer 3. Accordingly, the comparator 201 outputs a comparison-result signal S4 to the input port PI1 of the microcomputer 3. The output terminal of the comparator 201 is connected via a resistor 207 to the power feed line 200. The resistor 207 serves as a pull-up resistor for fixing a voltage level of the output signal S4 of the comparator 201. It should be noted that the resistor 207 may be omitted when the comparator 201 is of the totem pole type or the output-resistor built-in type.

One end of a resistor 202 is connected to the junction between the diode 203 and the resistor 204. The other end of the resistor 202 is grounded. The resistor 202 serves as a pull-down resistor for fixing a voltage level of the input signal S2.

An interruption port INT1 of the microcomputer 3 is connected to the communication bus 1 via a resistor 208. The resistor 208 limits a current flowing into the interruption port INT1 of the microcomputer 3 to protect the latter.

The comparator 201 detects or decides the logic level of the input signal S2 which corresponds to the voltage S1 at the communication bus 1. Specifically, the device 201 compares the voltage of the input signal S2 with the predetermined reference voltage S3. When the voltage of the input signal S2 is lower than the predetermined reference voltage S3, the output signal S4 of the comparator 201 assumes a logic "L" level. When the voltage of the input signal S2 is equal to or higher than the predetermined reference voltage S3, the output signal S4 of the comparator 201 assumes a logic "H" level.

The diode 203 blocks a forward current toward the communication bus 1, thereby providing the following function. The voltage S1 at the communication bus 1 is independent of whether the present node falls Into a stand-by state. Thus, it is possible to prevent interference with communication by another node, and to prevent another node to be forced out of a stand-by state. The resistor 204 limits a current flowing into the non-inverting input terminal of the comparator 201.

The forward voltage of the diode 203 varies in accordance with the temperature thereof. Therefore, the voltage of the input signal S2 has a temperature-dependent variation. The diode 209 provides a similar temperature-dependent variation of the predetermined reference voltage S3, thereby compensating for the temperature-dependent variation of the input signal S2 regarding the decision of the logic level of the input signal S2 by the comparator 201. Accordingly, It is possible to prevent the temperature-dependent variation of the input signal S2 from adversely affecting the decision of the logic level of the input signal S2 by the comparator 201. It is preferable that the diodes 203 and 209 have similar temperature-dependent characteristics.

As previously described, the interruption port INT1 of the microcomputer 3 is connected to the communication bus 1 via the resistor 208. The microcomputer 3 monitors conditions of the communication bus 1 via the interruption port INT1. As previously described, the voltage S1 at the communication bus 1 is equal to the logic "L" level when transmitted data is absent from the communication bus 1, that is, when stand-by conditions are present. The microcomputer 3 receives an interruption command via the interruption port INT1 when the voltage S1 at the communication bus 1 changes to a logic "H" level. Upon the reception of the interruption command, the microcomputer 3 starts the communication circuit 2F to enable the reception of data from the communication bus 1.

Eighth Embodiment

Figure 11:
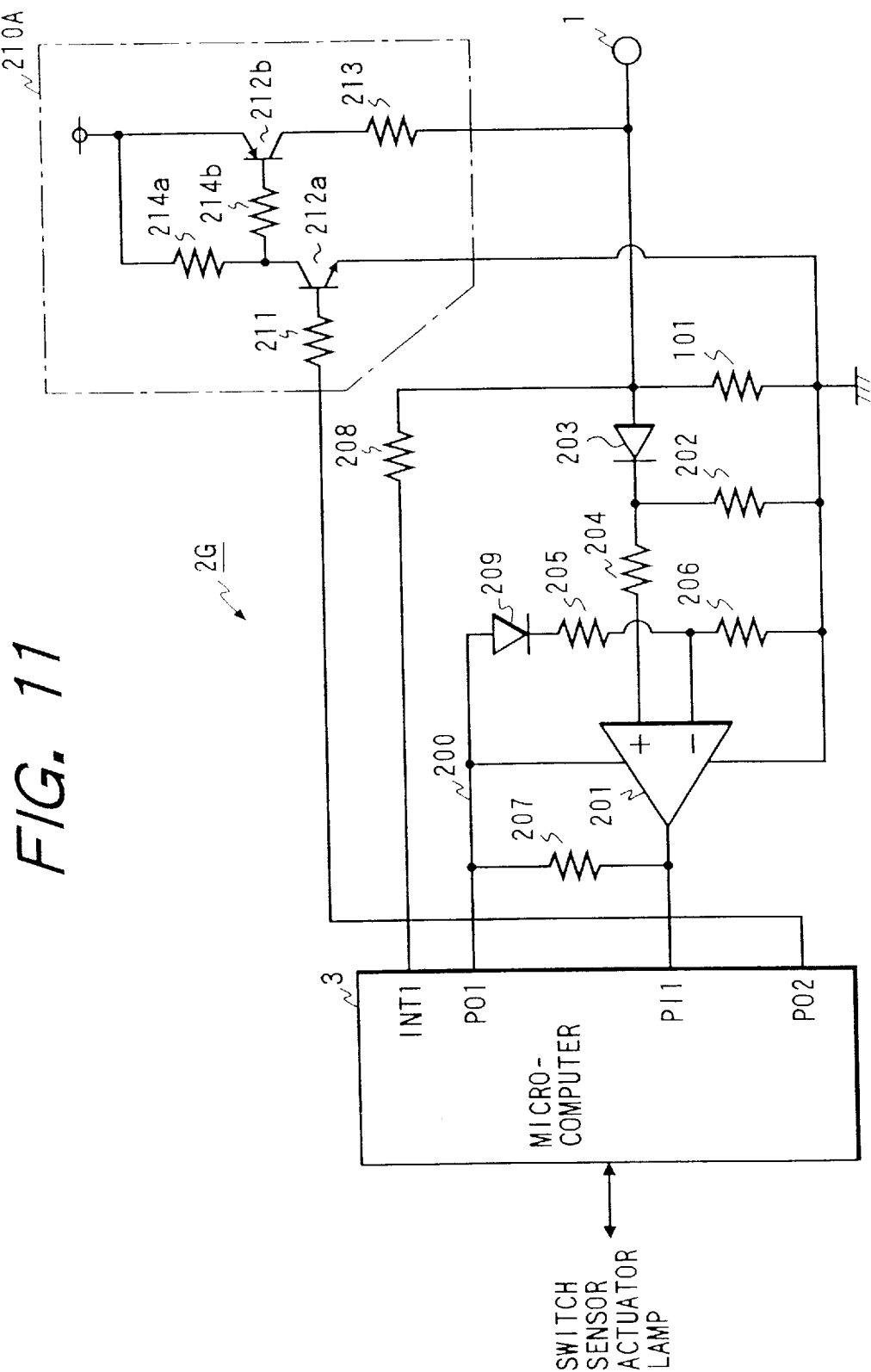
FIG. 11 is a diagram of a communication circuit and a microcomputer according to an eighth embodiment of this invention.

FIG. 11 shows an eighth embodiment of this invention which is similar to the embodiment of FIG. 10 except for an additional arrangement indicated hereinafter.

In the embodiment of FIG. 11, a communication circuit 2G includes a driver circuit 210A for enabling the transmission of data to the communication bus 1. The driver circuit 210A has a resistor 211, an NPN transistor 212a, a PNP transistor 212b, and resistors 213, 214a, and 214b. The base of the transistor 212a is connected to an output port PO2 of the microcomputer 3 via the resistor 211. The emitter of the transistor 212a is grounded. The collector of the transistor 212a is connected to the base of the transistor 212b via the resistor 214b. The collector of the transistor 212a is connected to a positive voltage line via the resistor 214a. The emitter of the transistor 212b is connected to the positive voltage line. The collector of the transistor 212b is connected to the communication bus 1 via the resistor 213.

When a signal outputted from the microcomputer 3 via its output port PO2 assumes a logic "H" level, the collector-emitter path of the transistor 212a and also the collector-emitter path of the transistor 212b become conductive so that the voltage S1 at the communication bus 1 rises to the logic "H" level. When the signal outputted from the microcomputer 3 via its output port PO2 assumes a logic "L" level, the collector-emitter path of the transistor 212a and also the collector-emitter path of the transistor 212b become non-conductive so that the voltage S1 at the communication bus 1 normally drops to the logic "L" level (the ground level). In this way, data can be transmitted from the microcomputer 3 to the communication bus 1 via the driver circuit 210A.

Ninth Embodiment

Figure 12:
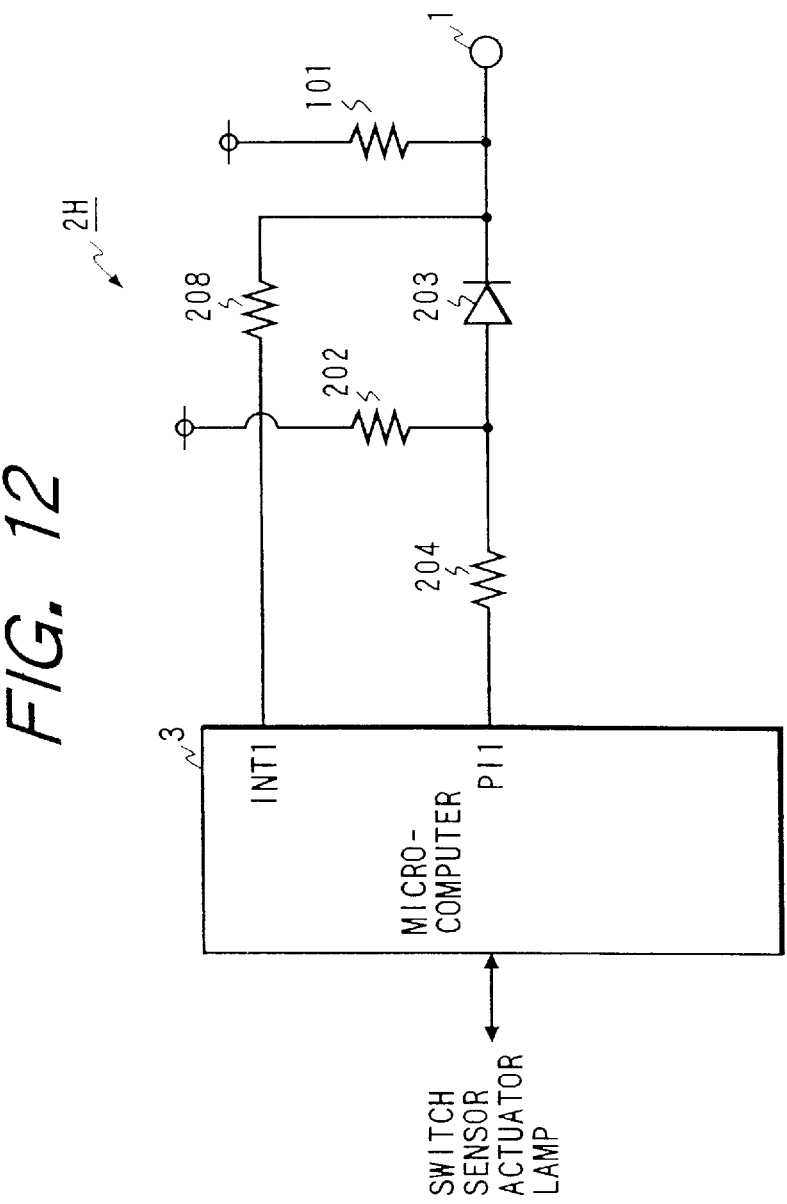
FIG. 12 is a diagram of a communication circuit and a microcomputer according to a ninth embodiment of this invention.

FIG. 12 shows a ninth embodiment of this invention which is similar to the embodiment of FIG. 2 except for a design change indicated hereinafter. The embodiment of FIG. 12 includes a communication circuit 2H in place of the communication circuit 2 of FIG. 2.

As shown in FIG. 12, the communication circuit 2H has a resistor 101 connected between the communication bus 1 and the positive voltage line. The resistor 101 serves as a pull-up resistor for fixing a voltage level of the communication bus 1.

The communication circuit 2H has a diode 203 and a resistor 204. The input port PI1 of the microcomputer 3 is connected to one end of the resistor 204. The other end of the resistor 204 is connected to the anode of the diode 203. The cathode of the diode 203 is connected to the communication bus 1. The input port PI1 of the microcomputer 3 receives an input signal S2 from the communication bus 1 via the diode 203 and the resistor 204. The input signal S2 corresponds to the voltage S1 at the communication bus 1. The diode 203 and the resistor 204 compose a protective device for the microcomputer 3. Specifically, the diode 203 blocks a backward current from the communication bus 1 toward the microcomputer 3, thereby protecting the microcomputer 3.

The resistor 204 limits a current flowing into the input port PI1 of the microcomputer 3.

The communication circuit 2H has a resistor 202. One end of the resistor 202 is connected to the junction between the diode 203 and the resistor 204. The other end of the resistor 202 is connected to the positive voltage line. The resistor 202 serves as a pull-up resistor for fixing a voltage level of the input signal S2.

An interruption port INT1 of the microcomputer 3 is connected to the communication bus 1 via a resistor 208. The resistor 208 limits a current flowing into the interruption port INT1 of the microcomputer 3 to protect the latter.

The microcomputer 3 has a function of suspending power feed to a portion thereof during detection of stand-by conditions.

Tenth Embodiment

FIG. 13 shows a tenth embodiment of this invention which is similar to the embodiment of FIG. 12 except for an additional arrangement indicated hereinafter.

In the embodiment of FIG. 13, a communication circuit 2J includes a driver circuit 210 for enabling the transmission of data to the communication bus 1. The driver circuit 210 has a resistor 211, an NPN transistor 212, and a resistor 213. The base of the transistor 212 is connected to an output port PO2 of the microcomputer 3 via the resistor 211. The emitter of the transistor 212 is grounded. The collector of the transistor 212 is connected to the communication bus 1 via the resistor 213.

When a signal outputted from the microcomputer 3 via its output port PO2 assumes a logic "H" level, the collector-emitter path of the transistor 212 becomes conductive so that the voltage S1 at the communication bus 1 drops to the logic "L" level (the ground level). When the signal outputted from the microcomputer 3 via its output port PO2 assumes a logic "L" level, the collector-emitter path of the transistor 212 becomes non-conductive so that the voltage S1 at the communication bus 1 is normally maintained at the logic "H" level. In this way, data can be transmitted from the microcomputer 3 to the communication bus 1 via the driver circuit 210.

Other Embodiments

Each of the first to the tenth embodiments may be modified so that an interruption command is applied to a latch-added input port of the microcomputer 3 rather than the interruption port INT1 thereof.

In a modification of each of the first to the tenth embodiments, a decision as to whether stand-by conditions or normally operating conditions are present is executed by detecting whether or not a dark current flows. A decision as to whether stand-by conditions or normally operating conditions are present may be executed by detecting conditions of the communication bus 1.

At least part of each of the communication circuits 2, 2A, 2B, 2C, 2D, 2E, 2F, 2G, 2H, and 2J may be provided in the microcomputer 3.

Each of the first to the tenth embodiments may be modified so that the microcomputer 3 is replaced by a logic circuit array.

Each of the first to the tenth embodiments can be applied to a battery-powered LAN system of any type. Each of the first to the tenth embodiments enables a saving of battery power.

What is claimed is:

1. A circuit arrangement disposed in a node within a local area network and connected to a communication bus within the local area network, comprising:

an input circuit for introducing data from the communication bus into the node;

node state detecting means for detecting whether or not the node is in a stand-by state;

power feed suspending means for suspending power feed to at least part of the input circuit when the node state detecting means detects that the node is in the stand-by state;

power feed restarting means for monitoring a voltage at the communication bus, and restarting the power feed to at least part of the input circuit when the voltage at the communication bus becomes equal to a level indicating reception of data; and a protective circuit for protecting the input circuit from an abnormal current which flows from the communication bus;

wherein the local area network comprises a local area network mounted on an automotive vehicle, and the node state detecting means comprises first sub means for detecting whether or not the automotive vehicle is parked, and second sub means for detecting that the node is in the stand-by state when the first sub means detects that the automotive vehicle is parked.

2. The circuit arrangement of claim 1, wherein the node state detecting means is operative for detecting that the automotive vehicle is parked on the basis of a logical product between a condition where all doors of the automotive vehicle are closed and a condition where an ignition switch is in an off position or an ignition key is out of a normal position.

3. The circuit arrangement of claim 1, wherein the node state detecting means is operative for detecting that the automotive vehicle is parked on the basis of a continuation of a logical product between a condition where all doors of the automotive vehicle are closed and a condition where an ignition switch is in an off position or an ignition key is out of a normal position for a predetermined time.

4. The circuit arrangement of claim 1, wherein the power feed suspending means is operative for suspending power feed to the input circuit when the node state detecting means detects that the node is in the stand-by state.

5. The circuit arrangement of claim 4, further comprising a microcomputer having an output port connected to the input circuit, means for feeding electric power to the input circuit via the output port of the microcomputer, and means for setting the output port of the microcomputer to an off state when the node state detecting means detects that the node is in the stand-by state.

6. The circuit arrangement of claim 5, wherein the input circuit comprises an input port of the microcomputer.

7. The circuit arrangement of claim 5, wherein the power feed suspending means comprises means for setting the microcomputer to a sleep state when the node state detecting means detects that the node is in the stand-by state.

8. The circuit arrangement of claim 4, wherein the power feed suspending means comprises a switch connected between the input circuit and a power supply source, and means for setting the switch to an off state when the node state detecting means detects that the node is in the stand-by state.

9. The circuit arrangement of claim 4, wherein the input circuit comprises means for generating a reference voltage, means for generating an input signal in response to a voltage at the communication bus, and a comparator for comparing the input signal with the reference voltage to decide a logic level of the voltage at the communication bus.

10. The circuit arrangement of claim 1, wherein the protective circuit comprises a diode interposed between the input circuit and the communication bus for blocking a backward current from the communication bus toward the input circuit.

11. The circuit arrangement of claim 10, further comprising a temperature compensating circuit for compensating a temperature-dependent variation in a forward voltage of the diode.

12. The circuit arrangement of claim 11, wherein the input circuit comprises means for generating a reference voltage, means for generating an input signal in response to a voltage at the communication bus, and a comparator for comparing the input signal with the reference voltage to decide a logic level of the voltage at the communication bus, and wherein the temperature compensating circuit comprises a diode connected in series with the reference-voltage generating means for changing the reference voltage in accordance with a variation in a forward voltage thereof.

13. The circuit arrangement of claim 1, wherein the protective circuit comprises a diode interposed between the input circuit and the communication bus for blocking a backward current from the communication bus toward the input circuit, and a resistor connected in series with the diode.

14. The circuit arrangement of claim 1, wherein the protective circuit comprises a diode interposed between the input circuit and the communication bus for blocking a backward current from the communication bus toward the input circuit, and a line buffer connected in series with the diode.

15. A circuit arrangement disposed in a node within a local area network and connected to a communication bus within the local area network, comprising:

an input circuit for introducing data from the communication bus into the node;

a microcomputer for controlling processing in the node; and a diode for protecting the input circuit from an abnormal current which flows from the communication bus;

wherein the microcomputer includes an input port for receiving data, an output port for outputting data, node state detecting means for detecting whether or not the node is in a stand-by state, power feed suspending means for suspending power feed to at least part of the input circuit when the node state detecting means detects that the node is in the stand-by state, and power feed restarting means for monitoring a voltage at the communication bus, and restarting the power feed to at least part of the input circuit when the voltage at the communication bus becomes equal to a level indicating reception of data;

wherein a current path is formed between the output port of the microcomputer and the communication bus via the diode;

wherein the local area network comprises a local area network mounted on an automotive vehicle, and the node state detecting means comprises first sub means for detecting whether or not the automotive vehicle is parked, and second sub means for detecting that the node is in the stand-by state when the first sub means detects that the automotive vehicle is parked.

* * * * *